United States Patent
Lewis et al.

[19]

[11] Patent Number: 6,135,104
[45] Date of Patent: *Oct. 24, 2000

[54] GAS GRILL WITH TILTING TANK SUPPORT

[75] Inventors: Aron P. Lewis, Lanette, Ala.; Alex T. Gafford, Midland, Ga.

[73] Assignee: W. C. Bradley Company, Columbus, Ga.

[*] Notice: This patent is subject to a terminal disclaimer.

[21] Appl. No.: 09/353,758

[22] Filed: Jul. 14, 1999

Related U.S. Application Data

[63] Continuation-in-part of application No. 09/134,211, Aug. 14, 1998, Pat. No. 5,931,149.

[51] Int. Cl.[7] .................................................. F24C 3/00
[52] U.S. Cl. ............................................... 126/41 R
[58] Field of Search ............................................. 126/41 R

[56] References Cited

U.S. PATENT DOCUMENTS

| | | | |
|---|---|---|---|
| 4,245,505 | 1/1981 | Baynes | 126/41 R |
| 4,413,515 | 11/1983 | Quinn | 126/41 R |
| 5,408,985 | 4/1995 | Giebel et al. | 126/41 R |
| 5,458,309 | 10/1995 | Craven et al. | 126/41 R |
| 5,873,355 | 2/1999 | Schlosser et al. | 126/41 R |
| 5,931,149 | 8/1999 | Lewis | 126/41 R |

*Primary Examiner*—Ira S. Lazarus
*Assistant Examiner*—David Lee
*Attorney, Agent, or Firm*—James W. Kayden, Esq.; Thomas, Kayden, Horstemeyer & Risley, L.L.P.

[57] ABSTRACT

A preferred embodiment of the gas grill with tilting tank support incorporates a tank support strut rotatably mounted to a support structure of the grill. Preferably, the tank support strut has a first longitudinal axis and is capable of rotation thereabout between a receiving position and a mounted position. In the mounted position, the tank support strut is adapted to engage the base of an LP gas tank so that the LP gas tank is arranged in a substantially upright orientation.

14 Claims, 5 Drawing Sheets

GAS GRILL WITH TILTING TANK SUPPORT

CROSS-REFERENCE TO RELATED APPLICATIONS

This application is a continuation-in-part application which is based on and claims priority to U.S. patent application Ser. No. 09/134,211, filed Aug. 14, 1998, now U.S. Pat. No. 5,931,149, issued on Aug. 3, 1999,

BACKGROUND OF THE INVENTION

1. Field of the Invention

The present invention relates generally to barbecue grills, and more particularly, to a gas grill which incorporates a movable support surface for supporting a gas supply tank.

2. Description of the Related Art

Gas fired barbecue grills are commonly mounted on wheeled carts and are fueled by LP gas, such as liquid propane gas, from a tank mounted on the cart. Typically, an LP gas tank is mounted on a supporting strut or on a lower shelf of the cart, usually at one end or the other of the cart, thereby providing easy access for removing and replacing the tank. When a tank has been emptied, it is disconnected from a gas regulator hose assembly and removed from its mounted position upon the cart and then typically transported to a refilling station. After the tank has been refilled, it is then remounted beneath the grill and reconnected to the gas regulator hose assembly. The grill may then be utilized for barbecuing once again.

Many grills include a means for securing the LP gas tank to the barbecue grill cart. This is typically accomplished by seating the LP gas tank on a strut or on the bottom shelf assembly of the grill cart in any suitable manner, such as with mounting clips. Additionally, the top of the tank is then typically secured with one or more clips, springs, or other means, such as disclosed in U.S. Pat. No. 5,458,309 issued to Craven, Jr. et al. Other methods used for securing LP gas tanks to grill carts include encircling the LP gas tank with a belt or strap, as disclosed in U.S. Pat. No. 4,949,701 issued to Krosp et al, and U.S. Pat. No. 4,984,515 issued to Pivonka, respectively, and mounting the LP gas tank upon clips supported upon a leg of the grill cart, as disclosed in U.S. Pat. No. 5,076,252 issued to Schlosser et al.

Although the prior art teaches what appear to be relatively simple methods of securing LP gas tanks to barbecue grill carts, there are certain disadvantages in the prior art. These disadvantages include the necessity to lift the emptied tank vertically until it is clear of its support surface, and then move the tank horizontally away from the grill cart assembly. This operation typically takes place in relatively tight quarters due to the almost universal side shelves which are common on grill cart assemblies. Such grill carts then require the person wishing to replace the LP gas tank upon the grill cart to lift a filled gas tank vertically from the ground and then move the filled tank horizontally in order to place the tank upon either a support surface, such as a shelf or strut which is arranged below the grill assembly, or a clip assembly which is supported by a leg of the grill cart. Such tanks typically weigh approximately forty (40) pounds when filled.

Additionally, when replacing a tank which is mounted on a clip assembly, as described above, the bottom shelf or struts of the grill cart cannot be utilized to partially support the LP gas tank during the time in which the tank is being secured to the cart. Moreover, some of the prior art mounting clips engage both the bottom rim of the LP gas tank and the carrying handle arranged in the upper collar of the LP gas tank, thus necessitating lifting and securing of the tank without the benefit of using the tank handle.

Thus, the need exists in the art for a means to remove and replace a barbecue grill LP gas tank which reduces the amount of lifting of a filled LP gas tank that a person must undertake, while making the installation and removal simple and secure.

BRIEF SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

Briefly stated, the present invention is directed to an improved barbecue grill for use with an LP gas tank that incorporates a tank support strut rotatably mounted to a support structure of the grill. Preferably, the tank support strut has a first longitudinal axis and is capable of rotation thereabout between a receiving position and a mounted position. In the mounted position, the tank support strut is adapted to engage the base of the LP gas tank so that the LP gas tank is arranged in a substantially upright orientation.

In accordance with another aspect of the present invention, a preferred embodiment of the support structure includes base member and first and second supports extending upwardly from the base member to support the grill assembly. So configured, when the tank support strut is in its mounted position, the LP gas tank is arranged between the tank support strut and the grill assembly.

In accordance with another aspect of the present invention, a preferred embodiment of the support structure includes a pair of strut-receiving notches. Preferably, each of the strut-receiving notches are defined by inwardly inclined walls so that a width of each of the strut-receiving notches decreases toward a bottom thereof. Additionally, the tank support strut preferably incorporates a pair of pins extending outwardly from its ends that are configured for engaging the strut-receiving notches so that the tank support strut is rotatable about the pins.

Other objects, features, and advantages of the present invention will become apparent to one with skill in the art upon examination of the following drawings and detailed description. It is intended that all such objects, features, and advantages be included herein within the scope of the present invention, as defined in the appended claims.

BRIEF DESCRIPTION OF THE SEVERAL VIEWS OF THE DRAWINGS

The present invention, as defined in the claims, can be better understood with reference to the following drawings. The drawings are not necessarily to scale, emphasis instead being placed on clearly illustrating the principles of the present invention.

DETAILED DESCRIPTION OF THE PREFERRED EMBODIMENT

Figure 1:
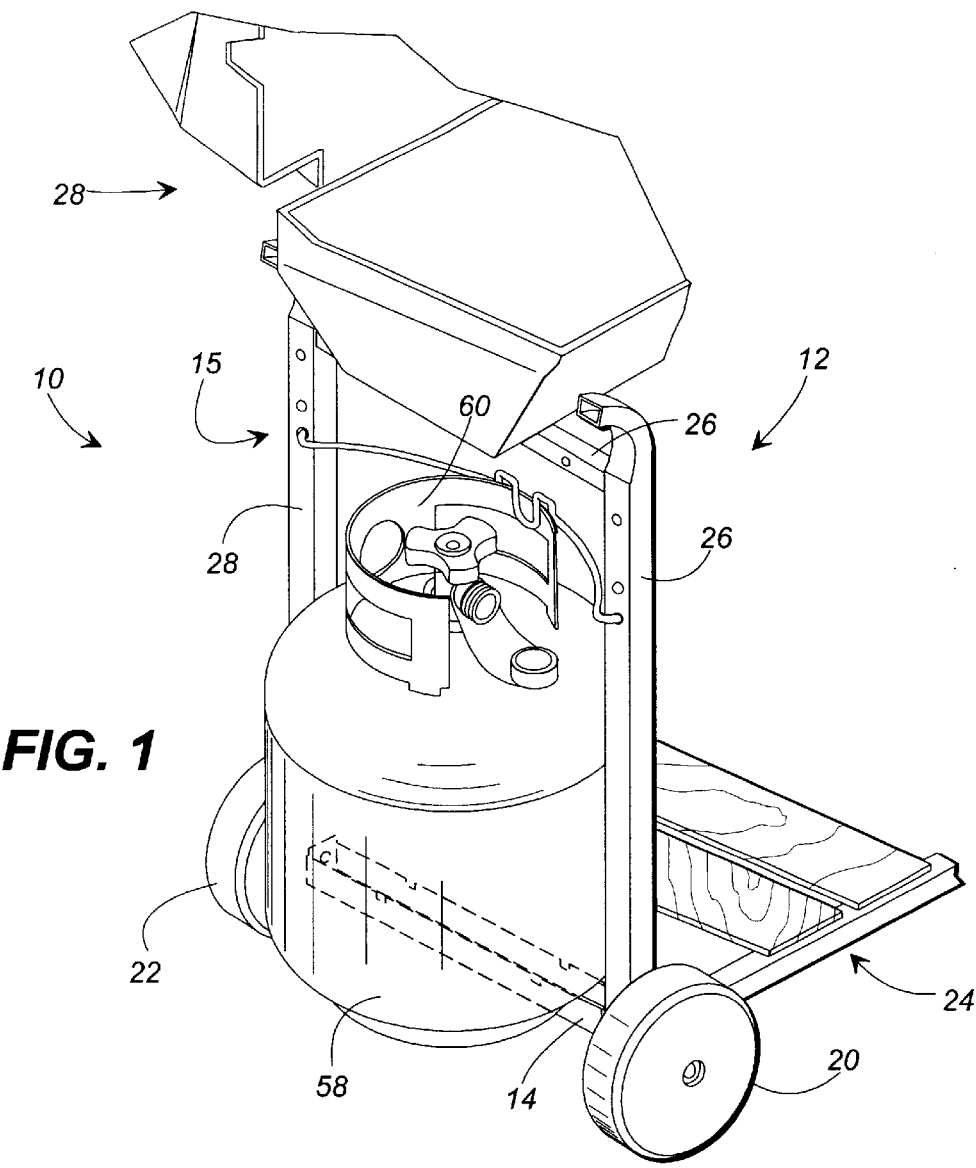
FIG. 1 is a partially cut-away, perspective view of a preferred embodiment of the present invention incorporated into a representative barbecue grill.

Reference will now be made in detail to the description of the invention as illustrated in the drawings with like numerals indicating like parts throughout the several views. FIG. 1 depicts a barbecue grill 10 incorporating a cart assembly 12 with which the tank support strut 14 of the present invention is utilized. In general, cart assembly 12 incorporates two leg assemblies, one of which is shown. Wheeled leg assembly 15 includes front leg 16 and rear leg 18 connected by tank support strut 14. Wheels 20 and 22 are connected to the cart legs, 16 and 18 respectively, to provide mobility to the grill, as is well known in the art. Bottom shelf assembly 24 and upper strut 26 are also connected to the cart legs to complete the cart assembly, thereby forming a rigid structure which serves to both support and transport grill assembly 28.

Figure 2:
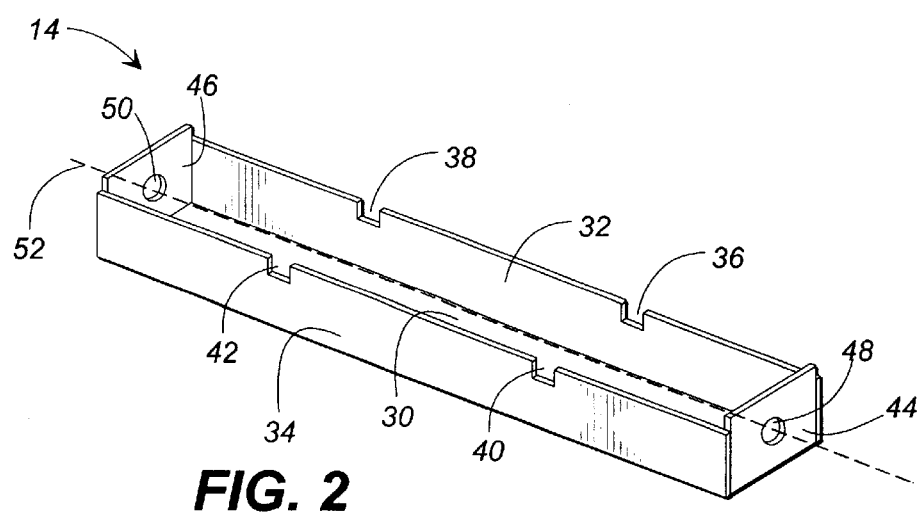
FIG. 2 is a perspective view of a preferred embodiment of the present invention.

As shown in FIGS. 1 and 2, a preferred embodiment of tank support strut 14 is configured as an elongated member, formed of steel or other suitable materials, with a base 30. Opposed side walls 32 and 34 extend upwardly from the periphery of the base with each side wall incorporating a pair of spaced notches 36 and 38, and 40 and 42, respectively. Opposed end walls 44 and 46 also extend upwardly from the periphery of the base with each end wall incorporating a bore, 48 and 50 respectively, which is generally centered along a longitudinal axis 52, shown in broken lines. Although shown incorporating rectangular side walls, end walls and base, strut 14 can be formed in various configurations.

Figure 3:
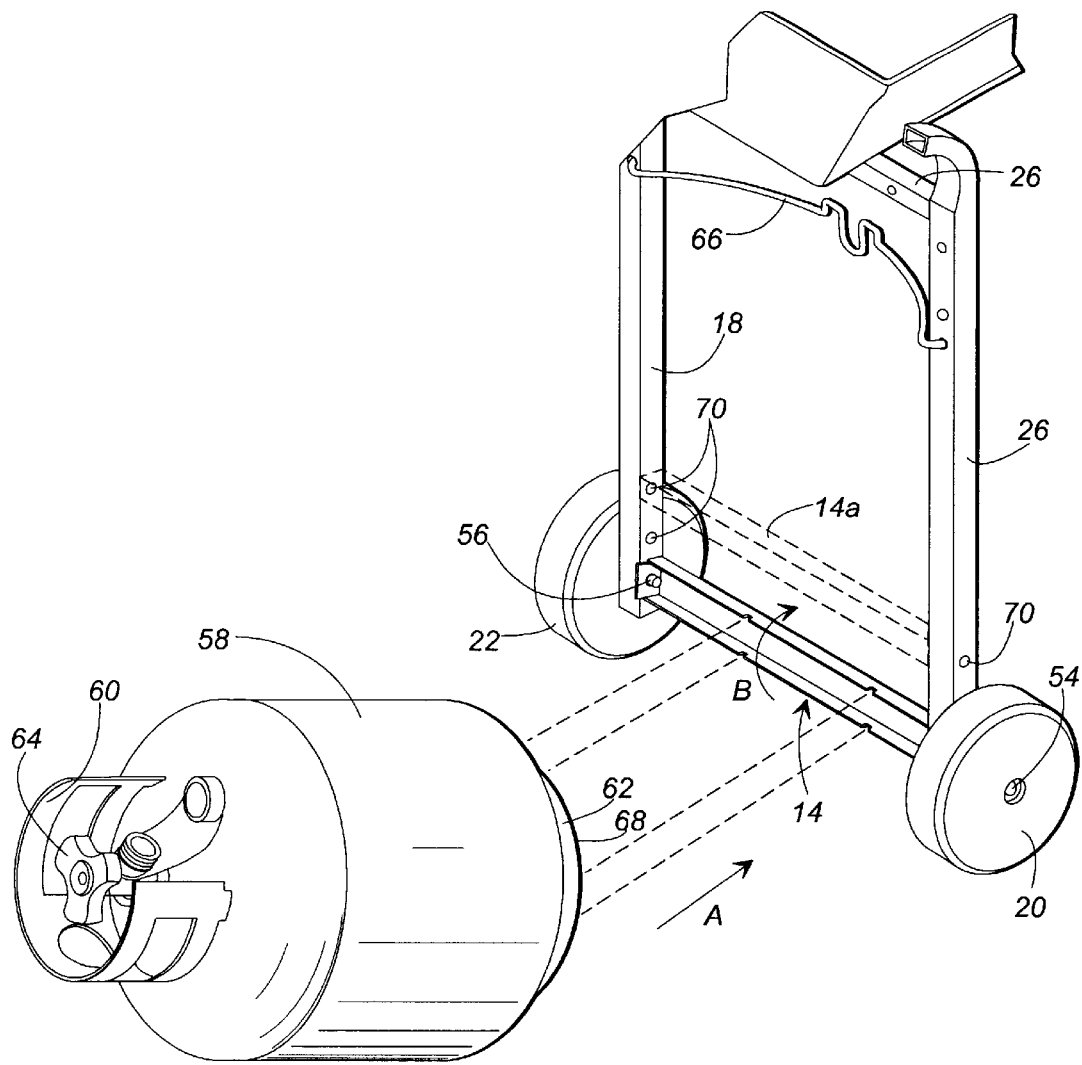
FIG. 3 is a partially cut-away, perspective view of a preferred embodiment of the present invention incorporated into a representative barbecue grill depicting a method of installing an LP gas tank onto the grill cart.

In the preferred embodiment of FIG. 3, strut 14 is rotatably mounted between legs 16 and 18 by means of axles 54 and 56 which are coaxial and which cooperate with bores 48 and 50, and which also rotatably mount wheels 20 and 22. Axles 54 and 56 are maintained in proper position in a conventional manner, such as by inserting a cotter pin (not shown) through a transverse bore (not shown) which is formed through the distal end of each axle, by engaging an externally threaded distal end of each axle with an internally threaded nut, etc, as is known in the art. While the present strut 14 is shown as coaxially mounted with the wheels, it is also contemplated by the present invention that the strut can be mounted at any level between the legs of the grill cart. For example, the strut (shown in FIG. 3 as strut 14a and represented in ghost) can utilize bores 70 and appropriate connecting means (not shown), such as bolts, pins, rods, etc, so as to support and be able to rotate for the mounting and removal of the gas tank.

LP gas tanks, such as gas tank 58 (FIGS. 1 and 3), typically incorporate a tank collar 60 which is normally welded to the upper portion of the gas tank, and a base 62 which is normally welded to the lower portion of the tank. The tank collar 60 is typically constructed in a circular shape so as to protect an LP gas valve 64 to which a gas regulator hose assembly (not shown) is attached for the purpose of conveying LP gas from the tank to a burner unit (not shown) which is mounted in the grill assembly. It is common practice that tank collar 60 also doubles as a carrying handle for transporting the tank to re filling stations, and for return to the barbecue grill cart assembly for reinstallation.

As shown in FIG. 3, LP gas tank 58 can be supported by the strut 14 both during and after installation. For instance, when the gas tank has been emptied, it is disconnected from the gas regulator hose assembly (not shown) and any associated securing means, such as tank holding wire 66, or other conventional means. The tank is then removed from its mounted position (FIG. 1) upon the tank support strut 14 by tilting the tank outwardly toward a horizontal position, facilitated by the rotation of the strut. A filled tank is then placed on its side adjacent the support strut which has been rotated to a receiving position (FIG. 3). The tank is then moved laterally in direction A toward the strut until the lower rim 68 of the base 62 of the tank engages the strut. Once so engaged, the support strut and the gas tank can be conveniently and simultaneously rotated upwardly and inwardly toward the cart assembly in direction B to the mounted position so that the tank is arranged in a substantially upright orientation upon the strut (FIG. 1). The securing means, i.e. wire 66, is reattached to the tank in order to maintain the tank in a substantially upright position, thereby functioning as a locking mechanism for substantially maintaining the strut and tank in the mounted position. The tank is then reconnected to the gas regulator hose assembly.

In preferred embodiments, notches 36, 38, 40 and 42 are oriented in a planar arrangement for promoting engagement of the notches with the base of an LP gas tank; however, the notches can be formed in various sizes, shapes and configurations depending on the particular application. For example, the spacing of the notches along the side walls can be varied in a known manner so that the orientation of the gas tank relative to the strut can be adjusted. As shown in the preferred embodiment of FIG. 3, the notches are centered down the lengths of their respective side walls. This particular configuration results in a tank with a mounted position which centers the tank along the length as well as across the width of the strut.

Figure 4:
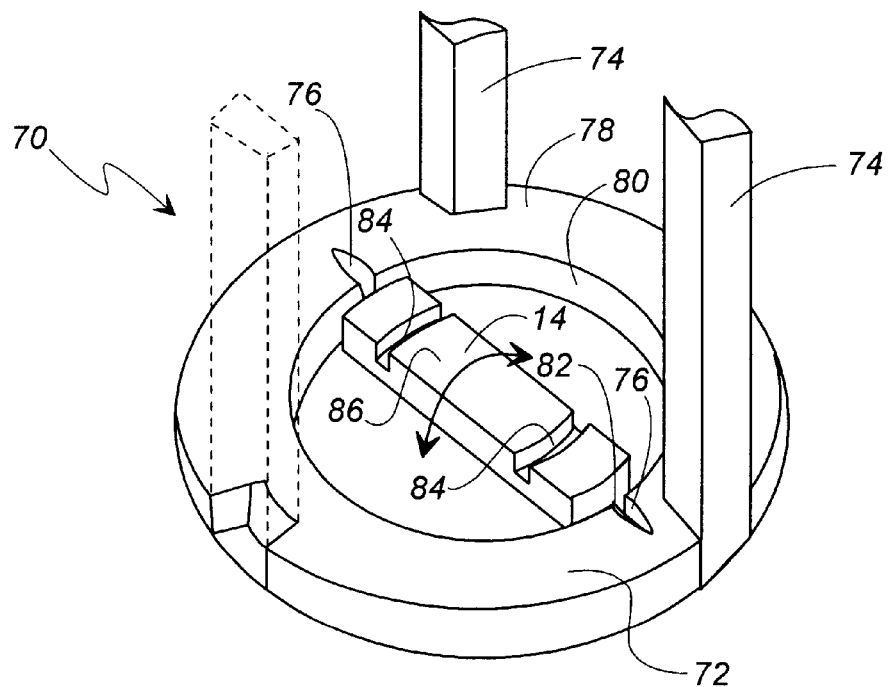
FIGS. 4–9 are partially cut-away, perspective views of alternative embodiments of the present invention incorporated into representative barbecue grills.

As shown in FIG. 4, the tank support strut 14 can be incorporated into a grill support structure 70 which is adapted to support a grill assembly (not shown). In the embodiment depicted in FIG. 4, the support structure includes a generally ring-shaped base member 72 to which a series of legs or support posts 74 are attached. The support posts 74 extend upwardly from base member 72 and support the grill assembly at a sufficient distance above base member 72 to allow placement of an LP gas tank upon a support strut 14, which preferably spans a diameter of the base member 72, so that the LP gas tank, when installed upon the strut, resides between the base member and the grill assembly.

Base member 72 preferably incorporates a pair of strut-receiving notches 76 which are oriented in diametrically opposed positions of the base member 72, with each notch extending from upper surface 78 to inner surface 80 of the base member. Preferably, the notches 76 are formed in a tapered configuration with the walls of each notch inwardly sloping toward each other so that the notch is narrower at its bottom than at the upper surface 78. So configured, the notches 76 are suited for properly seating pivot pins 82, which extend outwardly from the ends of the strut 14, by directing the pins downwardly toward the bottom of the notches with the inwardly sloping walls. Once the pivot pins 82 of the strut 14 are seated at the bottom of the notches 76, strut 14 is able to rotate about its longitudinal axis.

A pair of tank-receiving notches 84 are formed in the upper surface 86 of the strut 14 with the notches 84 being spaced from each other at an appropriate distance for receiving the lower rim 68 (FIG. 3) of an LP gas tank. Preferably, notches 84 are formed in a curved configuration so that the notches conform to the shape of the lower rim of the LP gas tank. Additionally, a tank holding wire, such as wire 66 shown in FIG. 3, for instance, can be utilized for securing the tank upon the support strut 14 in an upright position. Furthermore, it should be noted that the strut 14 is oriented so that an LP gas tank supported on the support strut 14 can be rotated about the longitudinal axis of the support strut and then removed from the strut without the gas tank being inhibited by the support posts 74.

Figure 5:
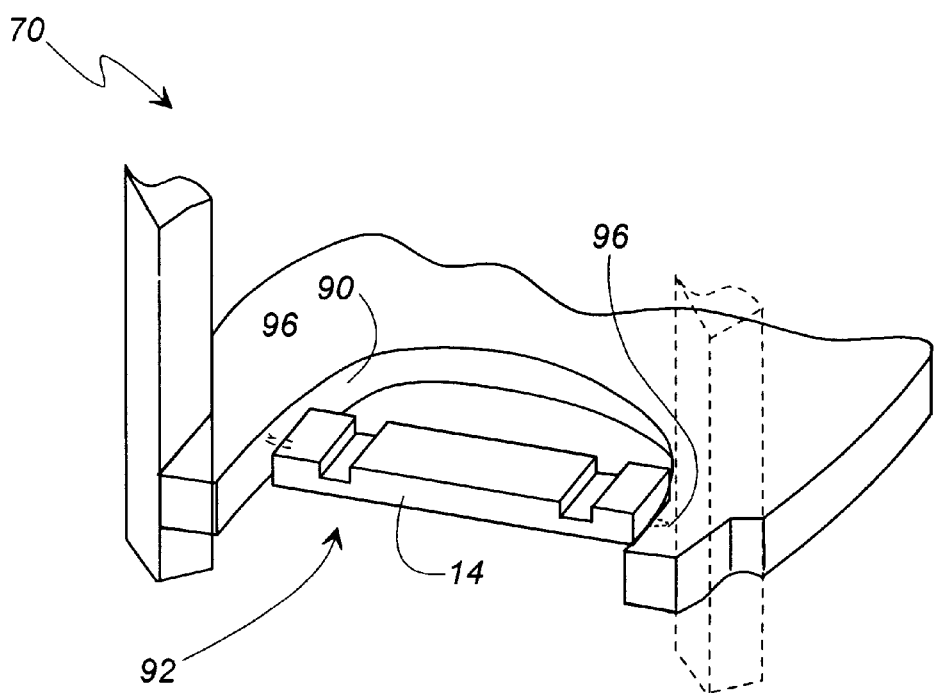

As shown in FIG. 5, a support structure 70 incorporates a support strut 14 which is adapted to rotatably engage side wall 90 of a tank recess portion 92 of the support structure 70 so that an LP gas tank can be mounted at one of the ends of the structure. Engagement of the support structure and the strut can be accomplished in numerous suitable ways including the axle and bore configuration depicted in FIGS. 1–3, the pivot pin and notch configuration depicted in FIG. 4, and multiple other pin and bore configurations which allow the support strut to rotate about its longitudinal axis relative to the support structure. Although all the aforementioned embodiments are capable of incorporating any suitable configuration for providing rotation of the strut about its longitudinal axis, the embodiment depicted in FIG. 5 preferably incorporates a pin and bore configuration. In particular, the support strut 14 incorporates pins 96 which extend outwardly from the ends of the strut, wherein the pins may be fixed, or one or both of the pins may be configured as a retractable pin which is biased to its outwardly extended position, such as by a spring. The pins are adapted to engage bores (not shown) formed through the side wall 90 of the tank recess 92. To facilitate assembly of the support structure and strut, the retractable pin(s) can be urged inwardly against the biasing force, aligned with respective bores, and then allowed to extend to their extended positions so that the pins are received within the bores. Where the pins are both fixed, they are designed to have sufficient length to engage the bores when the strut is mounted in place to receive the tank. The pins in this embodiment are then made short enough to be inserted sequentially into the bores in the side wall 90.

Additionally, other embodiments (not shown) of the strut and support structure each can incorporate a series of bores that are adapted for the receipt of cotter pins, or other securable pivots. The cotter pins are placed through the bores in the side wall 90 of the support structure, and then extend through bores formed in the opposing ends of the strut, thus capturing the strut therebetween. As previously described, these and other embodiments of the support structure can incorporate a tank wire for securing the tank upon the support strut 14.

Figure 6:
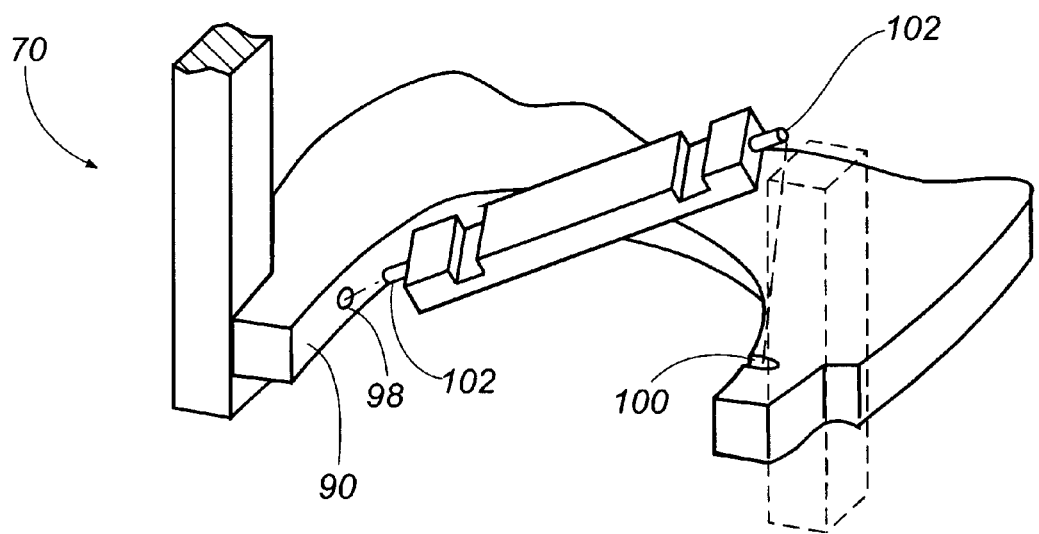

In the embodiment of FIG. 6, support structure 70 incorporates a bore 98 formed in side wall 90 and a strut-receiving notch 100 formed opposite the bore. Strut-receiving notch 100 is configured much like the notch 76, described hereinbefore, and is adapted to receive one of the pins 102 which extend outwardly from the support strut 14. So configured, the strut engages the support structure 70 by inserting one of the pins 102 within the bore 98 and then by aligning the other pin 102 within the strut-receiving notch 100.

Figure 7:
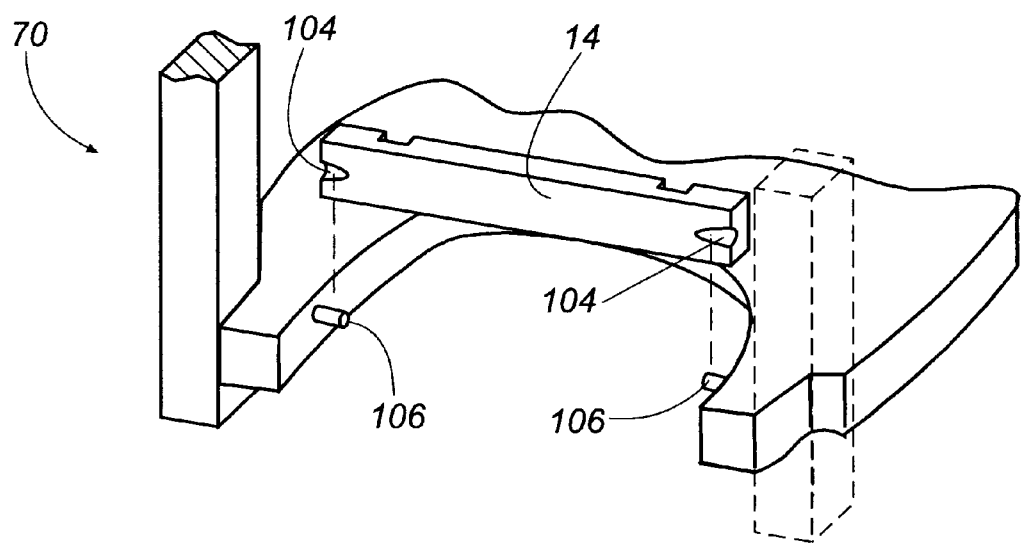
Figure 8:
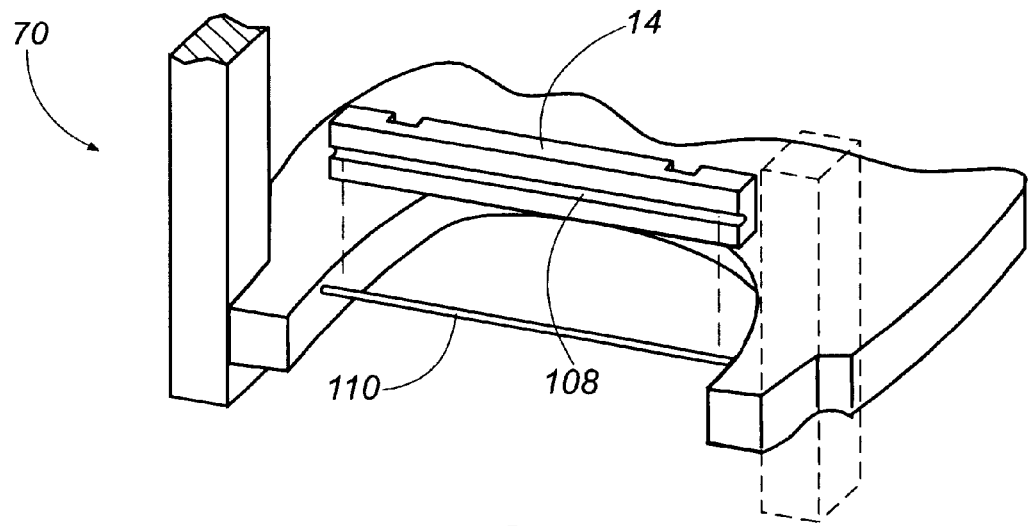

As shown in FIG. 7, an alternative embodiment of the present invention incorporates a strut 14 which includes a pin-receiving notch 104 at each of its ends. The notches 104 are adapted to receive pins 106 which extend from the side wall 90 of the support structure 70. Alternatively, the embodiment depicted in FIG. 8 includes a strut 14 which incorporates an axle-receiving slot 108. The slot 108 is adapted to receive an axle 100 about which the strut may rotate.

Figure 9:
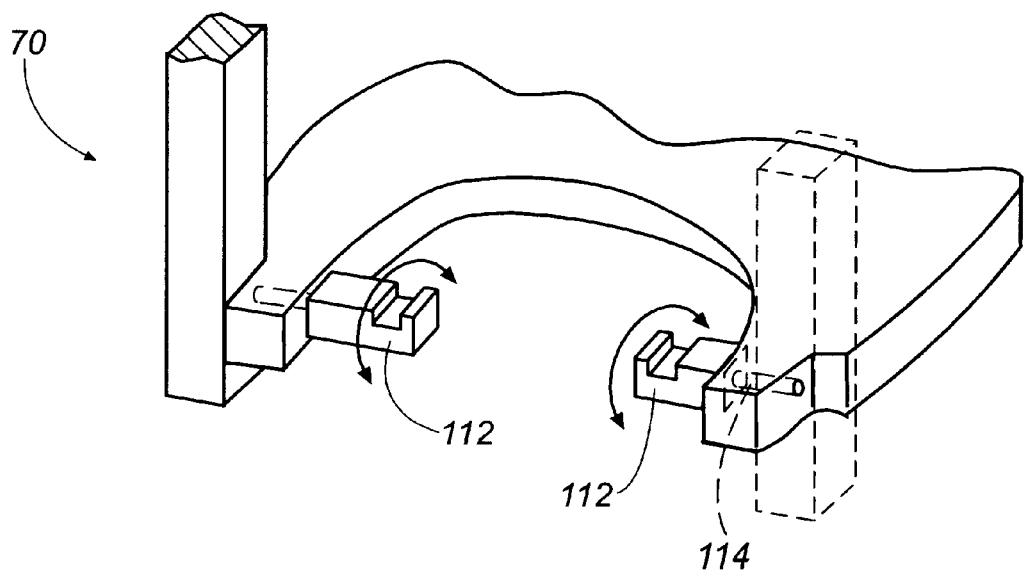

Additionally, as shown in FIG. 9, the support structure 70 can cooperate with a pair of strut members 112. Preferably, the strut members are spaced from each other and independently rotate to provide a rotatable support for an LP gas tank. Engagement of the strut members 112 to the support structure can be accomplished in various manners, including engaging an end of each strut member with a threaded bolt 114, among others.

The foregoing description has been presented for purposes of illustration and description. It is not intended to be exhaustive or to limit the invention to the precise forms disclosed. Obvious modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. An improved barbecue grill for use with an LP gas tank, said grill comprising:

a support structure;

a grill assembly mounted to said support structure, and;

a tank support strut rotatably mounted to said support structure, said tank support strut having a first longitudinal axis and capable of rotation about said first longitudinal axis between a receiving position and a mounted position, in said mounted position said tank support strut engaging said base of said LP gas tank such that said LP gas tank is arranged in a substantially upright orientation.

2. The barbecue grill of claim 1, wherein the LP gas tank has a base and said tank support strut has notches formed therein for engaging the base of the LP gas tank.

3. The barbecue grill of claim 1, wherein, in said mounted position, the LP gas tank is arranged between said tank support strut and said grill assembly.

4. The barbecue grill of claim 1, wherein said support structure has base member and first and second supports extending upwardly from said base member to support said grill assembly, and wherein, in said mounted position, the LP gas tank is arranged between said tank support strut and said grill assembly.

5. The barbecue grill of claim 1, wherein said support structure has a pair of strut-receiving notches formed therein and said tank support strut rotatably engages said pair of strut-receiving notches.

6. The barbecue grill of claim 1, further comprising a locking mechanism for substantially retaining said tank support strut in said mounted position.

7. The barbecue grill of claim 5, wherein each of said strut-receiving notches is defined by inwardly inclined walls such that a width of each of said strut-receiving notches decreases toward a bottom thereof.

8. The barbecue grill of claim 5, where in said tank support strut has a pair of pins, each of said pins extending outwardly from an end of said tank support strut and configured for engaging within one of said strut-receiving notches such that said tank support strut is rotatable about said pins.

9. The barbecue grill of claim 6, wherein said locking mechanism is a tank wire.

10. The barbecue grill of claim 8, further comprising an LP gas tank, said gas tank being adapted to mount to said tank support strut.

11. In combination with a grill support structure for use with an LP gas tank, the grill support structure configured for supporting a grill assembly, the improvement comprising:

a tank support strut rotatably mounted to the grill support structure, said tank support strut rotatable about a first rotational axis between a receiving position configured for engaging an LP gas tank and a mounted position configured for supporting an LP gas tank in a substantially upright orientation.

12. The combination of claim 11, wherein the grill support structure includes a base member and first and second supports extending upwardly from said base member to support the grill assembly, and wherein said tank support strut is oriented such that in said mounted position an LP gas tank engaging said tank support strut is arranged below the grill assembly.

13. An improved barbecue grill for use with an LP gas tank, said grill comprising:

a support structure;

a grill assembly mounted to said support structure, and;

at least one strut member rotatably mounted to said support structure, said strut member capable of rotation about a rotational axis between a receiving position and a mounted position, in said mounted position said strut member engaging said base of said LP gas tank such that said LP gas tank is arranged in a substantially upright orientation.

14. The barbecue grill of claim 13, wherein said barbecue grill has first and second ones of said strut member, said first and second strut members being spaced from each other and rotatable about said rotational axis.

* * * * *